2,811,446

ADDITIVE FOR FEEDS

Joseph A. Chenicek, Bensenville, Ill., assignor to Universal Oil Products Company, Des Plaines, Ill., a corporation of Delaware No Drawing. Application October 5, 1954,
Serial No. 460,505

5 Claims. (Cl. 99—4)

This is a continuation-in-part of copending application Serial No. 392,469, filed November 16, 1953, which, in turn, is a continuation-in-part of application Serial No. 176,531, filed July 28, 1950, now Patent No. 2,686,719. The present application relates to an additive for feeds and more particularly to a novel method of increasing the productivity and in effecting other improvements in animals, poultry, fish, etc.

The present invention is particularly applicable for use in poultry feeds in order to increase egg production. As will be shown in the example appended to the present specifications, experiments have been conducted in which the diets of two comparable groups of chickens have been selectively controlled. The diet of one of the groups of chickens contained the additive of the present invention, while the diet of the other group of chickens did not contain the additive. The first group of chickens, which have been supplied with the diet containing the additive, have produced eggs in a quantity of almost double to the quantity of eggs produced by the other group of chickens.

In addition, other improvements may result including, for example, increasing appetite and accordingly the amount of food consumed, hastening maturity and accordingly inducing an earlier time of egg laying, enhancing protein metabolism, increasing size and health of progeny especially where the beneficial effects are not consumed in egg laying or other functions, etc. Illustrative examples of poultry to which the present invention is particularly applicable include chickens, turkeys, ducks, geese, ostriches, game bird, canaries, parrots, parakeets, etc.

The present invention also is particularly applicable for use in feeds for domestic animals in order to increase the fertility thereof. For example, means of increasing the fertility of cattle, hogs, sheep, etc., is of extreme importance to farmers and other stock raisers. Also it is important to stimulate multiple births. Illustrative examples of domestic animals to which the present application is particularly applicable include hogs, cows, sheep, goats, horses, dogs, cats, etc. and illustrative examples of other animals include deer, buffalo, mink, monkeys, etc.

The examples hereinbefore set forth are preferred embodiments to which the present invention is particularly applicable. However, it is understood that the additive of the present invention may be utilized in any feed stock or as a supplement thereto. In another embodiment the present invention may be applied to insects where increased productivity is desired. For example, increased reproduction of bees would be desirable to the bee keepers, etc. Similarly the present invention may be desirable for use in the diets of reptiles, etc.

The term "productivity" is used in the present specifications and claims in a generic sense to include any improvement in the fertility, egg laying, or other functions of animals, and includes, for example, the specific illustrations set forth in the present specifications.

In one embodiment, the present invention relates to a method of improving the productivity of animals which comprises including in the diet therefor N,N'-di-alkyl-p-phenylene diamine in which each alkyl group contains at least seven carbon atoms.

In a specific embodiment the present invention relates to a method of increasing the production of eggs which comprises feeding chickens with a diet containing N,N'-di-sec-octyl-p-phenylene diamine in a concentration sufficient to effect said increase.

In another embodiment the present invention relates to animal feed containing N,N'-di-alkyl-p-phenylene diamine in which each alkyl group contains at least seven carbon atoms in an amount sufficient to impart improved productivity to said animal.

As hereinbefore set forth, improved productivity and other improvements are effected by including in the diet or supplementing the same with certain N,N'-di-alkyl-p-phenylene diamines. The N,N'-di-alkyl-p-phenylene diamine must contain at least seven carbon atoms in each alkyl group and preferably comprises secondary alkyl groups. In general, it is preferred that the number of alkyl groups does not exceed about 25 and thus the preferred compounds comprise N,N'-di-alkyl-p-phenylene diamines in which each alkyl group contains from seven to about 25 carbon atoms.

Preferred N,N'-di-alkyl-p-phenylene diamines include N,N'-di-heptyl-p-phenylene diamine, N,N'-di-octyl-p-phenylene diamine, N,N'-di-nonyl-p-phenylene diamine, N,N'-di-decyl-p-phenylene diamine, N,N'-di-undecyl-p-phenylene diamine, N,N'-di-dodecyl-p-phenylene diamine, N,N'-di-tridecyl-p-phenylene diamine, N,N'-di-tetradecyl-p-phenylene diamine, N,N'-di-pentadecyl-p-phenylene diamine, N,N'-di-hexadecyl-p-phenylene diamine, N,N'-di-heptadecyl-p-phenylene diamine, N,N'-di-octadecyl-p-phenylene diamine, N,N'-di-nonadecyl-p-phenylene diamine, N,N'-di-eicosyl-p-phenylene diamine, N,N'-di-heneicosyl-p-phenylene diamine, N,N'-di-docosyl-p-phenylene diamine, N,N'-di-tricosyl-p-phenylene diamine, N,N'-di-tetracosyl-p-phenylene diamine, and N,N'-di-pentacosyl-p-phenylene diamine.

As hereinbefore set forth, compounds in which the alkyl groups comprise secondary configuration are preferred. A particularly preferred compound for use in accordance with the present invention comprises N,N'-di-3-(5-methylheptyl)-p-phenylene diamine. Another preferred compound comprises N,N'-di-4-(2,6-di-methylheptyl)-p-phenylene diamine. Other preferred compounds comprise those specifically set forth in the previous paragraph in which the alkyl groups are secondary alkyl groups. Compounds having this configuration are readily prepared by the reductive alkylation of p-nitroaniline or p-phenylene diamine with a ketone. However, in some cases, compounds in which the alkyl groups comprise primary groups may be employed and such compounds may be prepared by the reductive alkylation of p-nitroaniline or p-phenylene diamine with an aldehyde. It is understood that the alkyl group itself may be straight or branched chain.

In some cases, the additive may contain two different alkyl groups, each containing from seven to about 25 carbon atoms. Compounds in this class may comprise, for example, N-heptyl-N'-octyl-p-phenylene diamine, N-heptyl-N'-nonyl-p-phenylene diamine, N-heptyl-N'-decyl-p-phenylene diamine, N-heptyl-N'-undecyl-p-phenylene diamine, N-heptyl-N'-dodecyl-p-phenylene diamine, etc., N-octyl-N'-nonyl-p-phenylene diamine, N-octyl-N'-decyl-p-phenylene diamine, N-octyl-N'-undecyl-p-phenylene diamine, N-octyl-N'-dodecyl-p-phenylene diamine, etc., N-decyl-N'-dodecyl-p-phenylene diamine, N-undecyl-N'-dodecyl-p-phenylene diamine, N-dodecyl-N'-hexadecyl-p-phenylene diamine, etc.

It will be noted that a large number of additive compounds may be prepared and used within the broad scope of the present invention. However, all of these compounds are not necessarily equivalent in their activity.

While the alkyl substituted compounds are definitely preferred, it is understood that in some cases N,N'-di-substituted compounds in which the substituents comprise alkenyl groups may be employed as, for example, compounds as N,N'-di-heptenyl-p-phenylene diamine, N,N'-di-octenyl-p-phenylene diamine, N,N'-di-nonenyl-p-phenylene diamine, N,N'-di-decenyl-p-phenylene diamine, etc., N-heptenyl-N'-nonenyl-p-phenylene diamine, N-octenyl-N'-decenyl-p-phenylene diamine, etc. In still other cases, compounds containing a cyclic substituent attached to one of the nitrogen atoms may be employed as, for example, in compounds as N-heptyl-N'-phenyl-p-phenylene diamine, N-octyl-N'-phenyl-p-phenylene diamine, etc., N-octyl-N'-cyclohexyl-p-phenylene diamine, N-decyl-N'-cyclohexyl-p-phenylene diamine, etc., N-heptenyl-N'-phenyl-p-phenylene diamine, etc. In this embodiment, at least one of the substituents attached to a nitrogen atom must be an alkyl group of at least seven carbon atoms. In still another embodiment N,N,N',N'-tetra-substituted-p-phenylene diamine compounds may be employed but at least one and preferably at least two of the substituents comprises alkyl groups of at least seven carbon atoms each. Illustrative compounds in this class include N,N'-di-heptyl-N,N'-di-methyl-p-phenylene diamine, N,N'-di-octyl-N,N'-di-methyl-p-phenylene diamine, etc., N,N'-di-heptyl-N,N'-di-ethyl-p-phenylene diamine, N,N'-di-octyl-N,N'-di-ethyl-p-phenylene diamine, etc., N,N'-di-heptyl-N,N'-di-propyl-p-phenylene diamine, N,N'-di-octyl-N,N'-di-propyl-p-phenylene diamine, etc., N,N'-di-heptyl-N,N'-di-butyl-p-phenylene diamine, N,N'-di-octyl-N,N'-di-butyl-p-phenylene diamine, etc., N,N'-di-heptyl-N,N'-di-amyl-p-phenylene diamine, N,N'-di-octyl-N,N'-di-amyl-p-phenylene diamine, etc., N,N'-di-heptyl-N,N'-di-hexyl-p-phenylene diamine, N,N'-di-octyl-N,N'-di-hexyl-p-phenylene diamine, etc., N,N,N',N'-tetra-heptyl-p-phenylene diamine, N,N,N',N'-tetra-octyl-p-phenylene diamine, etc. In still another embodiment the additive compound may contain one or more other substituents attached directly to the ring. The substituent or substituents preferably comprise alkyl, although other hydrocarbon groups or groups containing oxygen, nitrogen, and/or sulfur may be employed. However, the substituent must not impart toxicity to the additive compound or destroy its potency for the desired purpose. As hereinbefore set forth, the N,N'-di-alkyl-p-phenylene diamines in which each alkyl group contains at least seven carbon atoms are preferred for use in accordance with the present invention and the other classes of compounds herein set forth may be used in some cases, but with the understanding that they are not necessarily equivalent.

The preferred compounds for use in accordance with the present invention may be prepared by reductive alkylation or in any other suitable manner. A particularly preferred catalyst for effecting the reductive alkylation of p-nitro-aniline or p-phenylene diamine with a ketone or aldehyde comprises a mixture of the oxides of chromium, copper and barium, although other suitable catalysts may be employed. Other catalysts include nickel, nickel-kieselguhr, nickel sulfide, copper sulfide, molybdenum sulfide and those containing platinum, palladium, etc. The temperature to be employed generally will depend upon the particular catalyst used. When employing the mixture of chromium oxide, copper oxide and barium oxide catalyst, the temperature utilized is within the range of from about 200° to about 500° F., and the hydrogen pressure employed is within the range of from about 100 to about 3000 pounds or more and preferably within the range of from about 150 to about 1500 pounds.

The concentration of additive to be included in a diet or supplied separately to supplement the diet will vary with the particular diet. The additive will be used in amounts sufficient to effect the desired improvement. In most cases, this concentration will be within the range of from about 0.00001% to about 1% by weight of the diet and more particularly within the range of from about 0.0001% to about 0.1% by weight.

The additive may be incorporated in the feed in any suitable manner. When the feed is to be cooked, baked or the like, the additive may be incorporated before or after the cooking, baking, etc. When the feed is solid material, usually ground, mashed, pelleted, etc., and/or baked, cooked, fried, etc., the additive may be incorporated in the fed before or after such treatment or treatments. When the feed is liquid, the additive is readily incorporated therein by intimate mixing. When the additive is served separately, it preferably is prepared in a mixture with a suitable nontoxic solvent and served as a liquid or it may be prepared in admixture with a suitable non-toxic solid and served in any suitable solid form. In still another embodiment the additive may be supplied to the animal in any suitable manner including, for example, by injecting the additive, preferably as a solution or emulsion, into the animal, etc.

The additive may be used as such or it may be dissolved in a suitable non-toxic organic solvent or utilized as an emulsion in water, with or without a suitable emulsifying agent, when desired. Suitable solvents comprise vegetable oils, such as corn oil, soy bean oil, cotton seed oil, sesame oil, peanut oil, etc., or it may comprise other non-toxic solvents including, for example, propylene glycol, glycerine, etc. When utilized, any suitable emulsifying agent may be employed including, for example, Aerosol, Nacconol, Santomerse, etc., or those of the Gardinol type. In still another embodiment the additive may be prepared in admixture with suitable inert material, preferably as particles of definite size and shape as, for example, vermiculite which is harmless in the small amounts used and actually may be beneficial as an aid to digestion.

The additive of the present invention may be utilized in conjunction with other additives included in feeds for specific purposes. For example, it may be utilized along with vitamins, spices, etc., and, when desired, it may be prepared in admixture with one or more of the other additives and marketed as a single commodity of manifold purposes.

As hereinbefore set forth, the novel additive of the present invention is of advantage in improving productivity and effecting other improvements in animals. The additive is non-volatile and, therefore, will be satisfactorily retained in the feed. It is non-toxic in the small amounts utilized and, therefore, may be used satisfactorily for this purpose. The additive is stable at high temperatures and thus may be incorporated in the feed before cooking, baking, etc.

The following examples are introduced to illustrate further the novelty and utility of the present invention but not with the intention of unduly limiting the same.

EXAMPLE I

Newly born chicks were separated into two groups of 100 chicks in each group. Both groups were fed the same diet except that the additive of the present invention was incorporated, in a concentration of 0.015% by weight, in the feed for one group. The additive used in this example was N,N'-di-3-(5-methylheptyl)-p-phenylene diamine. A conventional diet, marketed under the trade name Nutrina, was used with these chicks, that is a scratch diet used for one to two weeks, chick starter used for the next six weeks, pullet grower used for the next twelve weeks, and chick mix used thereafter. The additive was not incorporated in the scratch diet but was incorporated in the other three diets.

The group which was fed on the conventional diet is designated in the following table as the "Control group," while the group which was fed with the diet containing the additive is designated as the "Experimental group." The results of 24 weeks are reported in the following table:

Table 1

|  | Control Group | Experimental Group |
|---|---|---|
| Average weight of chickens, pounds: | | |
| @ 6 weeks | 1.12 | 1.12 |
| @ 9 weeks | 2.25 | 2.25 |
| @ 12 weeks | 2.9 | 2.9 |
| @ 18 weeks | 4.4 | 4.4 |
| Total feed consumed, pounds: | | |
| to 6 weeks | 280 | 290 |
| to 12 weeks | 1,073 | 1,085 |
| to 18 weeks | 1,923 | 1,930 |
| to 24 weeks | 2,853 | 2,903 |
| Total egg production: | | |
| to 20 weeks | 1 | 9 |
| to 21 weeks | 17 | 42 |
| to 22 weeks | 46 | 118 |
| to 23 weeks | 124 | 257 |
| to 24 weeks | 238 | 422 |

At the end of 24 weeks the chickens in the experimental group consumed approximately 2 grams of the additive per chicken. The number of chickens alive at the end of 24 weeks was approximately the same in both groups.

From the data in the above table, it will be noted that the weight of the chickens remained the same. However, the chickens fed on the diet containing the additive consumed more feed. Of most importance are the data relating to the egg production. It will be noted that the chickens fed on the diet containing the additive produced almost double the quantity of eggs as compared to the quantity produced by the chickens of the control group. There was no noticeable difference between the size and taste of the eggs from either group.

EXAMPLE II 0.02% by weight of N,N'-di-4-(2,6-di-methylheptyl)-p-phenylene diamine may be incorporated in the diet of hogs, and may serve to increase the fertility thereof.

EXAMPLE III

N,N'-di-3-(methylheptyl)-p-phenylene diamine may be incorporated in a concentration of 0.025% by weight in the diet of sheep and may serve to increase multiple births, thereby providing the farmer with increased profits.

I claim as my invention:

1. A method of improving the productivity of poultry which comprises including in the poultry feed N,N'-di-alkyl-p-phenylene diamine in which each alkyl group contains at least seven carbon atoms, in an amount sufficient to effect said improvement.

2. Poultry feed containing from about 0.00001% to about 1% by weight of N,N'-di-alkyl-p-phenylene diamine in which each alkyl group contains at least seven carbon atoms.

3. Poultry feed containing from about 0.0001% to about 0.1% by weight of N,N'-di-sec-octyl-p-phenylene diamine.

4. Chicken feed containing from about 0.0001% to about 0.1% by weight of N,N'-di-3-(5-methylheptyl)-p-phenylene diamine.

5. Chicken feed containing from about 0.0001% to about 0.1% by weight of N,N'-di-4-(2,6-di-methylheptyl)-p-phenylene diamine.

References Cited in the file of this patent

UNITED STATES PATENTS

| 2,513,002 | Chenicek | June 27, 1950 |
| 2,686,719 | Chenicek | Aug. 17, 1954 |
| 2,700,612 | Chenicek | Jan. 25, 1955 |

OTHER REFERENCES

Morrison: Feeds and Feeding, 21st ed., 1951, Morrison Pub. Co., Ithaca, N. Y., pages 23–29.